US012452611B2

(12) United States Patent
Hertzberg

(10) Patent No.: US 12,452,611 B2
(45) Date of Patent: Oct. 21, 2025

(54) FEEDBACK CANCELLATION IN A HEARING AID DEVICE USING TAP COHERENCE VALUES

(71) Applicant: NUANCE HEARING LTD., Tel Aviv (IL)

(72) Inventor: Yehonatan Hertzberg, Shoham (IL)

(73) Assignee: Nuance Hearing Ltd., Tel-Aviv (IL)

( * ) Notice: Subject to any disclaimer, the term of this patent is extended or adjusted under 35 U.S.C. 154(b) by 89 days.

(21) Appl. No.: 18/491,847

(22) Filed: Oct. 23, 2023

(65) Prior Publication Data

US 2025/0133355 A1 Apr. 24, 2025

(51) Int. Cl.
*H04R 25/00* (2006.01)

(52) U.S. Cl.
CPC ........... *H04R 25/453* (2013.01); *H04R 25/60* (2013.01)

(58) Field of Classification Search
CPC ....... G10L 21/0208; G10L 2021/02087; G10L 2021/02166; H04R 25/505; H04R 3/005; H04R 1/1083; H04R 2225/43; H04R 25/453; H04R 25/60; H04R 2201/401
USPC .... 381/312, 318, 71.1, 317, 71.11, 93, 71.6, 381/92, 83, 94.1, 122
See application file for complete search history.

(56) References Cited

U.S. PATENT DOCUMENTS 3,119,903 A 1/1964 Rosemond et al.
4,904,078 A 2/1990 Gorike
5,263,089 A 11/1993 Ribic
5,793,875 A 8/1998 Lehr et al.
6,289,327 B1 9/2001 Woodsum et al.
6,434,539 B1 8/2002 Woodsum et al.
7,031,483 B2 4/2006 Boone et al.
7,092,690 B2 8/2006 Zancewicz
(Continued)

FOREIGN PATENT DOCUMENTS

CA 2297344 A1 8/2000
CN 205608327 U 9/2016
(Continued)

OTHER PUBLICATIONS

International Application # PCT/IB2024/058971 Search Report dated Jan. 20, 2025.
(Continued)

*Primary Examiner* — Norman Yu
(74) *Attorney, Agent, or Firm* — Meitar Patents Ltd.; Daniel Kligler

(57) ABSTRACT

A system for hearing assistance includes one or more microphones, a speaker and processing circuitry. The one or more microphones are configured to be mounted in proximity to a head of a subject and to output electrical signals in response to acoustic waves that are incident on the microphones. The speaker is configured for mounting in proximity to an ear of the subject. The processing circuitry is configured to amplify and filter the electrical signals so as to generate a drive signal for input to the speaker using a digital filter having multiple taps with respective tap coefficients selected to suppress feedback from the speaker to the microphones, and to compute the tap coefficients adaptively while estimating respective coherence values of the tap coefficients over time and weighting updates applied to the tap coefficients responsively to the respective coherence values.

10 Claims, 4 Drawing Sheets

(56) References Cited

U.S. PATENT DOCUMENTS

| | | | |
|---|---|---|---|
| 7,099,486 | B2 | 8/2006 | Julstrom et al. |
| 7,103,192 | B2 | 9/2006 | Bailey |
| 7,369,669 | B2 | 5/2008 | Hagen et al. |
| 7,369,671 | B2 | 5/2008 | Sacha |
| 7,542,580 | B2 | 6/2009 | Burns |
| 7,609,842 | B2 | 10/2009 | Sipkema et al. |
| 7,735,996 | B2 | 6/2010 | Van Der Zwan et al. |
| 7,809,149 | B2 | 10/2010 | Burns |
| 7,822,217 | B2 | 10/2010 | Hagen et al. |
| 8,116,493 | B2 | 2/2012 | Westermann |
| 8,139,801 | B2 | 3/2012 | Sipkema et al. |
| 8,494,193 | B2 | 7/2013 | Zhang et al. |
| 8,611,554 | B2 | 12/2013 | Short et al. |
| 8,744,101 | B1 | 6/2014 | Burns |
| 9,113,245 | B2 | 8/2015 | Gelhard |
| 9,282,392 | B2 | 3/2016 | Ushakov |
| 9,288,589 | B2 | 3/2016 | Cheung |
| 9,392,381 | B1 | 7/2016 | Park et al. |
| 9,591,410 | B2 | 3/2017 | Short et al. |
| 9,635,474 | B2 | 4/2017 | Kuster |
| 9,641,942 | B2 | 5/2017 | Strelcyk et al. |
| 9,734,822 | B1 | 8/2017 | Sundaram et al. |
| 9,753,311 | B2 | 9/2017 | Fan |
| 9,763,016 | B2 | 9/2017 | Merks et al. |
| 9,781,523 | B2 | 10/2017 | Kuster et al. |
| 9,810,925 | B2 | 11/2017 | Fan |
| 9,812,116 | B2 | 11/2017 | Ushakov |
| 9,832,576 | B2 | 11/2017 | Jensen et al. |
| 9,980,054 | B2 | 5/2018 | McCracken |
| 10,056,091 | B2 | 8/2018 | Orescanin et al. |
| 10,102,850 | B1 | 10/2018 | Basye et al. |
| 10,225,670 | B2 | 3/2019 | Feilner et al. |
| 10,231,065 | B2 | 3/2019 | Udesen |
| 10,353,221 | B1 | 7/2019 | Graff et al. |
| 10,379,386 | B2 | 8/2019 | Fan |
| D865,040 | S | 10/2019 | Schaal et al. |
| D874,008 | S | 1/2020 | Kotzer et al. |
| 10,567,888 | B2 | 2/2020 | Hertzberg et al. |
| 10,582,295 | B1 | 3/2020 | Zhong et al. |
| 10,721,572 | B2 | 7/2020 | Petersen et al. |
| 10,805,739 | B2 | 10/2020 | Sjursen |
| 10,820,121 | B2 | 10/2020 | Lunner et al. |
| 11,259,127 | B2 | 2/2022 | De Haan et al. |
| 11,363,389 | B2 | 6/2022 | Pedersen et al. |
| 11,510,019 | B2 | 11/2022 | Rohde et al. |
| 11,521,633 | B2 | 12/2022 | Liu |
| 2004/0076301 | A1 | 4/2004 | Algazi et al. |
| 2004/0252845 | A1 | 12/2004 | Tashev |
| 2006/0013416 | A1 | 1/2006 | Truong et al. |
| 2007/0038442 | A1 | 2/2007 | Visser et al. |
| 2008/0192968 | A1 | 8/2008 | Ho et al. |
| 2009/0296044 | A1 | 12/2009 | Howell et al. |
| 2009/0323973 | A1 | 12/2009 | Dyba |
| 2011/0091057 | A1 | 4/2011 | Derkx et al. |
| 2011/0293129 | A1 | 12/2011 | Dillen et al. |
| 2012/0128175 | A1 | 5/2012 | Msser et al. |
| 2012/0215519 | A1 | 8/2012 | Park et al. |
| 2012/0224715 | A1 | 9/2012 | Kikkeri |
| 2014/0093091 | A1 | 4/2014 | Dusan et al. |
| 2014/0093093 | A1 | 4/2014 | Dusan et al. |
| 2014/0270316 | A1 | 9/2014 | Kopina et al. |
| 2015/0036856 | A1 | 2/2015 | Pruthi et al. |
| 2015/0049892 | A1 | 2/2015 | Petersen et al. |
| 2015/0201271 | A1 | 7/2015 | Diethorn et al. |
| 2015/0230026 | A1 | 8/2015 | Eichfeld et al. |
| 2015/0289064 | A1 | 10/2015 | Jensen et al. |
| 2016/0111113 | A1 | 4/2016 | Cho et al. |
| 2017/0272867 | A1 | 9/2017 | Zisapel et al. |
| 2018/0146285 | A1 | 5/2018 | Benattar et al. |
| 2018/0270565 | A1 | 9/2018 | Ganeshkumar |
| 2018/0330747 | A1 | 11/2018 | Ebenezer |
| 2018/0350379 | A1 | 12/2018 | Wung et al. |
| 2018/0359294 | A1 | 12/2018 | Brown et al. |
| 2019/0104370 | A1 | 4/2019 | Zisapel et al. |
| 2019/0373355 | A1 | 12/2019 | Lee et al. |
| 2019/0394576 | A1* | 12/2019 | Petersen .............. H04R 25/453 |
| 2019/0394586 | A1 | 12/2019 | Pedersen et al. |
| 2020/0005770 | A1 | 1/2020 | Lunner et al. |
| 2021/0345047 | A1 | 11/2021 | Sabin et al. |
| 2022/0201403 | A1 | 6/2022 | Khaleghimeybodi et al. |
| 2023/0336926 | A1 | 10/2023 | Hertzberg et al. |

FOREIGN PATENT DOCUMENTS

| | | | |
|---|---|---|---|
| CN | 106157965 | A | 11/2016 |
| CN | 206115061 | U | 4/2017 |
| CN | 206920741 | U | 1/2018 |
| CN | 207037261 | U | 2/2018 |
| CN | 208314369 | U | 1/2019 |
| CN | 208351162 | U | 1/2019 |
| CN | 209693024 | U | 11/2019 |
| CN | 209803482 | U | 12/2019 |
| EP | 4093055 | A1 | 11/2022 |
| ES | 1213304 | U | 5/2018 |
| KR | 20130054898 | A | 5/2013 |
| KR | 101786613 | B1 | 10/2017 |
| KR | 102006414 | B1 | 8/2019 |
| WO | 9960822 | A1 | 11/1999 |
| WO | 2004016037 | A1 | 2/2004 |
| WO | 2013169618 | A1 | 11/2013 |
| WO | 2017129239 | A1 | 8/2017 |
| WO | 2017158507 | A1 | 9/2017 |
| WO | 2017171137 | A1 | 10/2017 |
| WO | 2018127298 | A1 | 7/2018 |
| WO | 2018127412 | A1 | 7/2018 |
| WO | 2018234628 | A1 | 12/2018 |
| WO | 2021014344 | A1 | 1/2021 |
| WO | 2022133086 | A1 | 6/2022 |

OTHER PUBLICATIONS

International Application # PCT/IB2024/058969 Search Report dated Jan. 23, 2025.

CN Application # 202080050547.6 Office Action dated Mar. 27, 2025.

EP Application # 20877167.5 Search Report dated Dec. 4, 2023.

Pauline et al., "Variable tap-length non-parametric variable step-size NLMS adaptive filtering algorithm for acoustic echo cancellation," Applied Acoustics, Elsevier, vol. 159, pp. 1-10, Feb. 2020.

Spriet et al., "Feedback control in hearing aids," Springer Handbook of Speech Processing and Speech Communication (Chapter 48, Part H.—Speech Enhancement; Benesty et al., eds.), Springer, pp. 1-29, year 2007.

Hoydal, "A New Own Voice Processing System for Optimizing Communication," The Hearing Review, pp. 1-8, Nov. 2017, as downloaded from https://hearingreview.com/practice-building/marketing/new-voice-processing-system-optimizing-communication.

Wikipedia, "Least Mean Squares Filter," pp. 1-6, last edited Jul. 23, 2019.

Camacho et al., "Phase Coherence Imaging: Principles, applications and current developments," POMA—Proceedings of Meetings on Acoustics, 2019 International Congress on Ultrasonics, Signal Processing in Acoustics: PSP (2/3) Presentation 1, pp. 1-7, year 2019.

Hertzberg, U.S. Appl. No. 18/476,369, filed Sep. 28, 2023.

Chen et al., "Novel Radiation Pattern by Genetic Algorithms in Wireless Communication," Proceedings of the IEEE VTS 53rd Vehicular Technology Conference, pp. 8-12, year 2001.

Mitchell, "An Introduction to Genetic Algorithms," MIT Press, pp. 1-162, year 1998.

Haupt, "An Introduction to Genetic Algorithms for Electromagnetics," IEEE Antennas and Propagation Magazine, vol. 37, No. 2, pp. 7-15, Apr. 1995.

Elbir et al., "Twenty-Five Years of Advances in Beamforming: From Convex and Nonconvex Optimization to Learning Techniques," IEEE Signal Processing Magazine, vol. 40, No. 4, pp. 118-131, Jun. 2023.

Alkaher et al., "Temporal Howling Detector for Speech Reinforcement Systems," MDPI, Acoustics, vol. 4, pp. 967-995, year 2022.

(56) References Cited

OTHER PUBLICATIONS

Van Waterschoot, "Fifty Years of Acoustic Feedback Control: State of the Art and Future Challenges," Proceedings of the IEEE, vol. 99, No. 2, pp. 288-327, Feb. 2011.
U.S. Appl. No. 17/766,736 Office Action dated Jan. 11, 2024.
Widrow et al., "Microphone Arrays for Hearing Aids: An Overview", Speech Communication, vol. 39, pp. 139-146, year 2003.
Bose Hearphones™, "Hear Better", pp. 1-3, Feb. 19, 2017.
Veen et al., "Beamforming Techniques for Spatial Filtering", CRC Press, pp. 1-23, year 1999.
"ICE40 Series MobileFPGA Family," Product Information, Lattice Semiconductor, Santa Clara, Calif., pp. 1-2, last updated May 13, 2021, as downloaded from https://www.mouser.co.il/new/lattice-semiconductor/lattice-ice40-FPGA/.
Choi et al., "Blind Source Separation and Independent Component Analysis: A Review," Neural Information Processing—Letters and Review, vol. 6, No. 1, pp. 1-57, year 2005.
Mukai et al., "Real-Time Blind Source Separation and DOA Estimation Using Small 3-D Microphone Array," Proceedings of the International Workshop on Acoustic Echo and Noise Control (IWAENC), pp. 45-48, year 2005.
Huang et al., "Real-Time Passive Source Localization: A Practical Linear-Correction Least-Squares Approach," IEEE Transactions on Speech and Audio Processing, vol. 9, No. 8, pp. 943-956, year 2001.
Sawada et al., "Direction of Arrival Estimation for Multiple Source Signals Using Independent Component Analysis," IEEE Proceedings of the Seventh International Symposium on Signal Processing and its Applications, vol. 2, pp. 1-4, year 2003.
Adavanne et al., "Direction of Arrival Estimation for Multiple Sound Sources Using Convolutional Recurrent Neural Network," 26th European Signal Processing Conference (EUSIPCO), IEEE, pp. 1462-1466, year 2018.
Byrne et al., "An International Comparison of Long-Term Average Speech Spectra," The Journal of the Acoustical Society of America, vol. 96, No. 4, pp. 2108-2120, year 1994.
Wikipedia, "Direction of Arrival," pp. 1-2, last edited Nov. 15, 2020.
Dibiase, "A High-Accuracy, Low-Latency Technique for Talker Localization in Reverberant Environments Using Microphone Arrays," Doctoral Thesis, Division of Engineering, Brown University, Providence, Rhode Island, pp. 1-122, year 2000.

* cited by examiner

FEEDBACK CANCELLATION IN A HEARING AID DEVICE USING TAP COHERENCE VALUES

FIELD

The present invention relates generally to hearing aids, and particularly to devices and methods for acoustic feedback cancellation.

BACKGROUND

Speech understanding in noisy environments is a significant problem for the hearing-impaired. Hearing impairment is usually accompanied by a reduced time resolution of the sensorial system in addition to a gain loss. These characteristics further reduce the ability of the hearing-impaired to filter the target source from the background noise and particularly to understand speech in noisy environments.

Some newer hearing aids offer a directional hearing mode to improve speech intelligibility in noisy environments. This mode makes use of array of microphones and applies beamforming technology to combine multiple microphone inputs into a single, directional audio output channel. The output channel has spatial characteristics that increase the contribution of acoustic waves arriving from the target direction relative to those of the acoustic waves from other directions.

For example, PCT International Publication WO 2017/158507, whose disclosure is incorporated herein by reference, describes hearing aid apparatus, including a case, which is configured to be physically fixed to a mobile telephone. An array of microphones are spaced apart within the case and are configured to produce electrical signals in response to acoustical inputs to the microphones. An interface is fixed within the case, along with processing circuitry, which is coupled to receive and process the electrical signals from the microphones so as to generate a combined signal for output via the interface.

As another example, PCT International Publication WO 2021/074818, whose disclosure is incorporated herein by reference, describes apparatus for hearing assistance, which includes a spectacle frame, including a front piece and temples, with one or more microphones mounted at respective first locations on the front piece and configured to output electrical signals in response to first acoustic waves that are incident on the microphones. A speaker mounted at a second location on one of the temples outputs second acoustic waves. Processing circuitry generates a drive signal for the speaker by processing the electrical signals output by the microphones so as to cause the speaker to reproduce selected sounds occurring in the first acoustic waves with a delay that is equal within 20% to a transit time of the first acoustic waves from the first location to the second location, thereby engendering constructive interference between the first and second acoustic waves.

SUMMARY

Embodiments of the present invention that are described hereinbelow provide improved devices and methods for hearing assistance.

An embodiment that is described herein provides a system for hearing assistance that includes one or more microphones, a speaker and processing circuitry. The one or more microphones are configured to be mounted in proximity to a head of a subject and to output electrical signals in response to acoustic waves that are incident on the microphones. The speaker is configured for mounting in proximity to an ear of the subject. The processing circuitry is configured to amplify and filter the electrical signals so as to generate a drive signal for input to the speaker using a digital filter having multiple taps with respective tap coefficients selected to suppress feedback from the speaker to the microphones, and to compute the tap coefficients adaptively while estimating respective coherence values of the tap coefficients over time and weighting updates applied to the tap coefficients responsively to the respective coherence values.

In some embodiments, the processing circuitry is configured to adapt the tap coefficients so as to estimate a transfer function between the speaker and one or more of the microphones.

In other embodiments the processing circuitry is configured to adapt the tap coefficients using a gradient descent method having respective convergence factors. In yet other embodiments, the processing circuitry is configured to respectively calculate the convergence factors based on the coherence values.

In an embodiment, the processing circuitry is configured to calculate the convergence factors by multiplying a common convergence factor by the respective coherence values. In another embodiment, the processing circuitry is configured to evaluate a coherence value for a given tap based on multiple coefficient updates calculated for the given tap over a specified time period. In yet another embodiment, the system for hearing assistance includes a spectacle frame, and the microphones and the speaker are mounted at respective locations on the spectacle frame.

In some embodiments, the one or more microphones include multiple microphones, and the processing circuitry is configured to apply a beamforming function to the electrical signals output by the multiple microphones so as to emphasize selected sounds that originate within a selected angular range while suppressing background sounds originating outside the selected angular range.

There is additionally provided, in accordance with an embodiment that is described herein, a method for hearing assistance, including mounting in proximity to a head of a subject an array of microphones, which output electrical signals in response to acoustic waves that are incident on the microphones and mounting a speaker in proximity to an ear of the subject. The electrical signals are amplified and filtered so as to generate a drive signal for input to the speaker using a digital filter having multiple taps with respective tap coefficients selected to suppress feedback from the speaker to the microphones. The tap coefficients are computed adaptively while respective coherence values of the tap coefficients are estimated over time and updates applied to the tap coefficients are weighted responsively to the respective coherence values.

There is additionally provided, in accordance with another embodiment that is described herein, a head-mountable device (HMD), including a frame, one or more microphones, a speaker and processing circuitry. The frame is configured for mounting on a head of a subject. The one or more microphones are mounted on the frame and are configured to output electrical signals in response to acoustic waves that are incident on the microphones. The speaker is mounted on the frame. The processing circuitry is configured to amplify and filter the electrical signals so as to generate a drive signal for input to the speaker using a digital filter having multiple taps with respective tap coefficients selected to suppress feedback from the speaker to the microphones, and to compute the tap coefficients adaptively while estimating respective coherence values of the tap coefficients over time and weighting updates applied to the tap coefficients responsively to the respective coherence values.

In some embodiments, the HMD includes a device selected from a list including: an eyewear device, a spectacle, a glasses frame, goggles, a helmet, visors, a headset, and a clip-on device. In other embodiments, the one or more microphones are mounted on a front piece of the frame, and the speaker is mounted on the frame in proximity to an ear of the subject.

The present invention will be more fully understood from the following detailed description of the embodiments thereof, taken together with the drawings in which:

DETAILED DESCRIPTION

Overview

Figure 1:
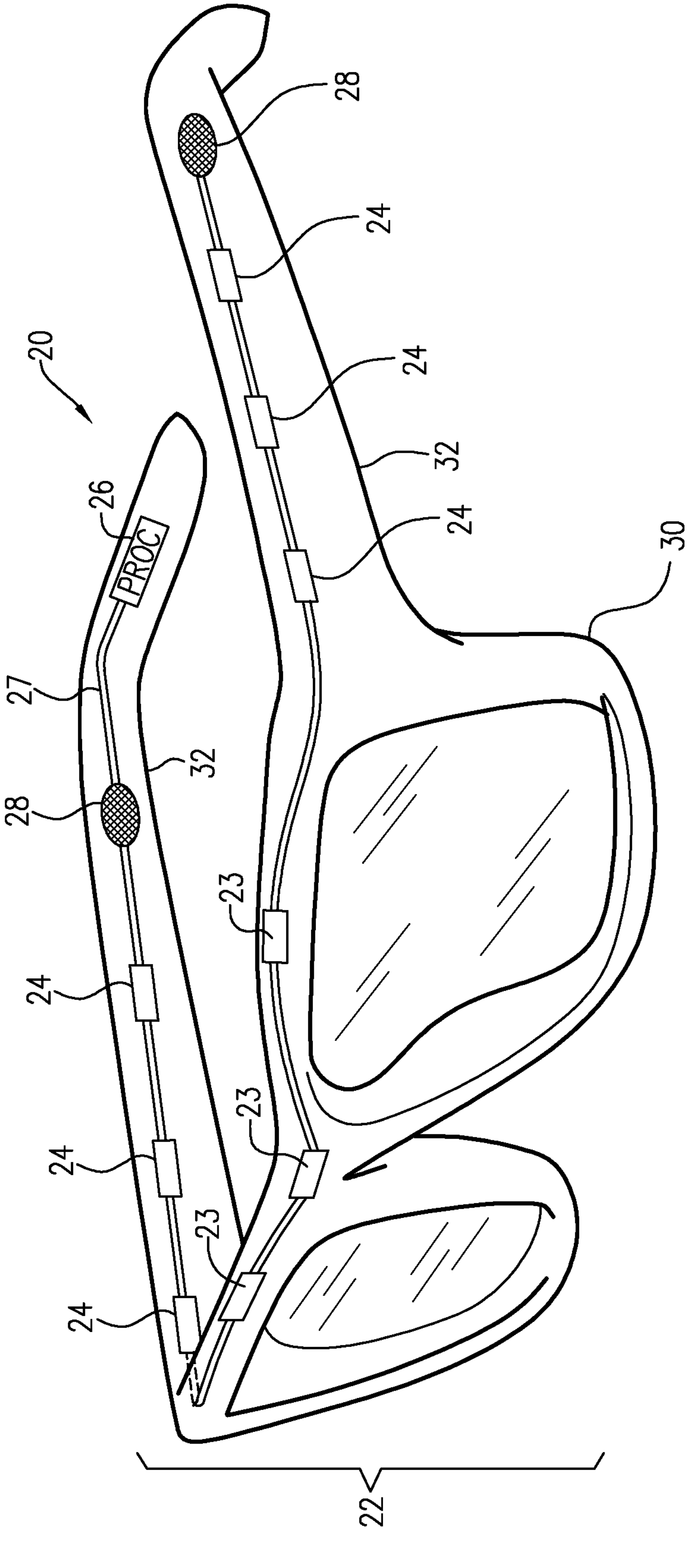
FIG. 1 is a schematic pictorial illustration showing a hearing assistance device based on a spectacle frame, in accordance with an embodiment of the invention.

Despite the need for directional hearing assistance and the theoretical benefits of microphone arrays in this regard, in practice the directional performance of hearing aids falls far short of that achieved by natural hearing. In general, good directional hearing assistance requires a relatively large number of microphones, spaced well apart, in a design that is unobtrusive while enabling the user to aim the directional response of the hearing aid easily toward a point of interest, such as toward a conversation partner in noisy environment. Processing circuitry applies a beamforming filter to the signals output by the microphones in response to incident acoustic waves to generate an audio output that emphasizes sounds that impinge on the microphone array within an angular range around the direction of interest while suppressing background noise. The audio output should reproduce the natural hearing experience as nearly as possible while minimizing bothersome artifacts.

One of these artifacts is the strong whistle that can arise due to acoustic feedback from the audio output of a speaker located in proximity to the user's ear to the input of the microphones. Such whistling arises when the acoustic feedback gain of the hearing aid at a given frequency is greater than a certain threshold. Feedback cancellation in a hearing aid device is typically more challenging than in applications such as video conferencing and phone calls in which the echoed signal may be delayed by about 100 milliseconds, whereas in hearing aid devices the feedback signal is typically delayed by less than 20 milliseconds, resulting is high correlation between the spectra of the system output and input. Conventional solutions for suppressing or canceling feedback signals include reducing the gain of the hearing aid and filtering the range of audio frequencies at which the feedback arises, but these solutions also reduce the effectiveness of the hearing aid in amplifying faint and high-pitched sounds. It is also possible to reduce the feedback gain mechanically by fitting an ear mold to the user's ear, but many users find this solution uncomfortable and unsightly.

Embodiments of the present invention that are described herein address the problem of acoustic feedback by providing methods and systems for novel feedback cancellation, by estimating the feedback signal and subtracting it from the input signal. In the disclosed embodiments, an array of microphones, mounted in proximity to the head of a user, outputs electrical signals in response to incoming acoustic waves that are incident on the microphones. A speaker is mounted in proximity to the user's ear. Processing circuitry amplifies and filters the electrical signals so as to generate a drive signal for input to the speaker using a digital filter having multiple taps with respective tap coefficients selected to suppress feedback from the speaker to the microphones, and to compute the tap coefficients adaptively while estimating respective coherence values of the tap coefficients over time and weighting updates applied to the tap coefficients responsively to the respective coherence values.

In some embodiments, the microphones and speaker are mounted on a frame that is mounted on the user's head. In some of the embodiments that are described below, the microphones and speakers are mounted on a spectacle frame. Alternatively, the microphones and speaker can be mounted on other sorts of frames or head-mounted devices (HMDs), such as a Virtual Reality (VR) or Augmented Reality (AR) headset, or in other sorts of mounting arrangements.

In the present context, an HMD comprises any sort of frame on which the microphones and speaker(s) can be mounted. The HMD may be selected from a list comprising (but not limited to): an eyewear device, a spectacle, a glasses frame, goggles, a helmet, visors, a headset, and a clip-on device. In some embodiments, the one or more microphones are mounted on a front piece of the frame, and the speaker is mounted on the frame in proximity to an ear of the subject.

In some embodiments, the processing circuitry adapts the tap coefficients so as to estimate a transfer function between the speaker and one or more of the microphones. The processing circuitry uses the estimated transfer function to estimate a feedback signal to be subtracted from an input signal.

The processing circuitry may adapt the tap coefficients using a gradient descent method having respective convergence factors, which the processing circuitry respectively calculates based on the coherence values. In an embodiment, the processing circuitry calculates the convergence factors by multiplying a common convergence factor by the respective coherence values.

In some embodiments, the processing circuitry evaluates a coherence value for a given tap based on multiple coefficient updates calculated for the given tap over a specified time period.

In some embodiments, the system comprises a spectacle frame, wherein the microphones and the speaker are mounted at respective locations on the spectacle frame.

In an embodiment, the one or more microphones comprise multiple microphones, and the processing circuitry applies a beamforming function to the electrical signals output by the multiple microphones so as to emphasize selected sounds that originate within a selected angular range while suppressing background sounds originating outside the selected angular range.

System Description

FIG. 1 is a schematic pictorial illustration of a hearing assistance device 20 that is integrated into a spectacle frame 22, in accordance with an embodiment of the invention. An array of microphones 23, 24 are mounted at respective locations on spectacle frame 22 and output electrical signals in response to acoustic waves that are incident on the microphones. In the pictured example, microphones 23 are mounted on a front piece 30 of frame 22, while microphones 24 are mounted on temples 32, which are connected to respective edges of front piece 30. Although the extensive array of microphones 23 and 24 that is shown in FIG. 1 is useful in some applications of the present invention, the principles of signal processing and hearing assistance that are described herein may alternatively be applied, mutatis mutandis, using smaller numbers of microphones. For example, these principles may be applied using an array of microphones 23 on front piece 30, as well as in devices using other microphone mounting arrangements, not necessarily spectacle-based.

Processing circuitry 26 is fixed within or otherwise connected to spectacle frame 22 and is coupled by electrical wiring 27, such as traces on a flexible printed circuit, to receive the electrical signals output from microphones 23, 24. Although processing circuitry 26 is shown in FIG. 1, for the sake of simplicity, at a certain location in temple 32, some or all of the processing circuitry may alternatively be located in front piece 30 or in a unit connected externally to frame 22. Processing circuitry 26 mixes the signals from the microphones so as to generate an audio output with a certain directional response, for example by applying beamforming functions so as to emphasize the sounds that originate within a selected angular range while suppressing background sounds originating outside this range. Typically, although not necessarily, the directional response is aligned with the angular orientation of frame 22. The processing circuitry additionally suppresses acoustic signals originating from the speaker that are picked up by the microphones.

These signal processing functions of processing circuitry 26 are described in greater detail hereinbelow.

Processing circuitry 26 may convey the audio output to the user's ear via any suitable sort of interface and speaker. In the pictured embodiment, the audio output is created by a drive signal for driving one or more audio speakers 28, which are mounted on temples 32, typically in proximity to the user's ears. Although only a single speaker 28 is shown on each temple 32 in FIG. 1, device 20 may alternatively comprise only a single speaker on one of temples 32, or it may comprise two or more speakers mounted on one or both of temples 32. In this latter case, processing circuitry 26 may apply a beamforming function in the drive signals so as to direct the acoustic waves from the speakers toward the user's ears. Alternatively, the drive signals may be conveyed to speakers that are inserted into the ears or may be transmitted over a wireless connection, for example as a magnetic signal, to a telecoil in a hearing aid (not shown) of a user who is wearing the spectacle frame.

Signal Processing

Figure 2:
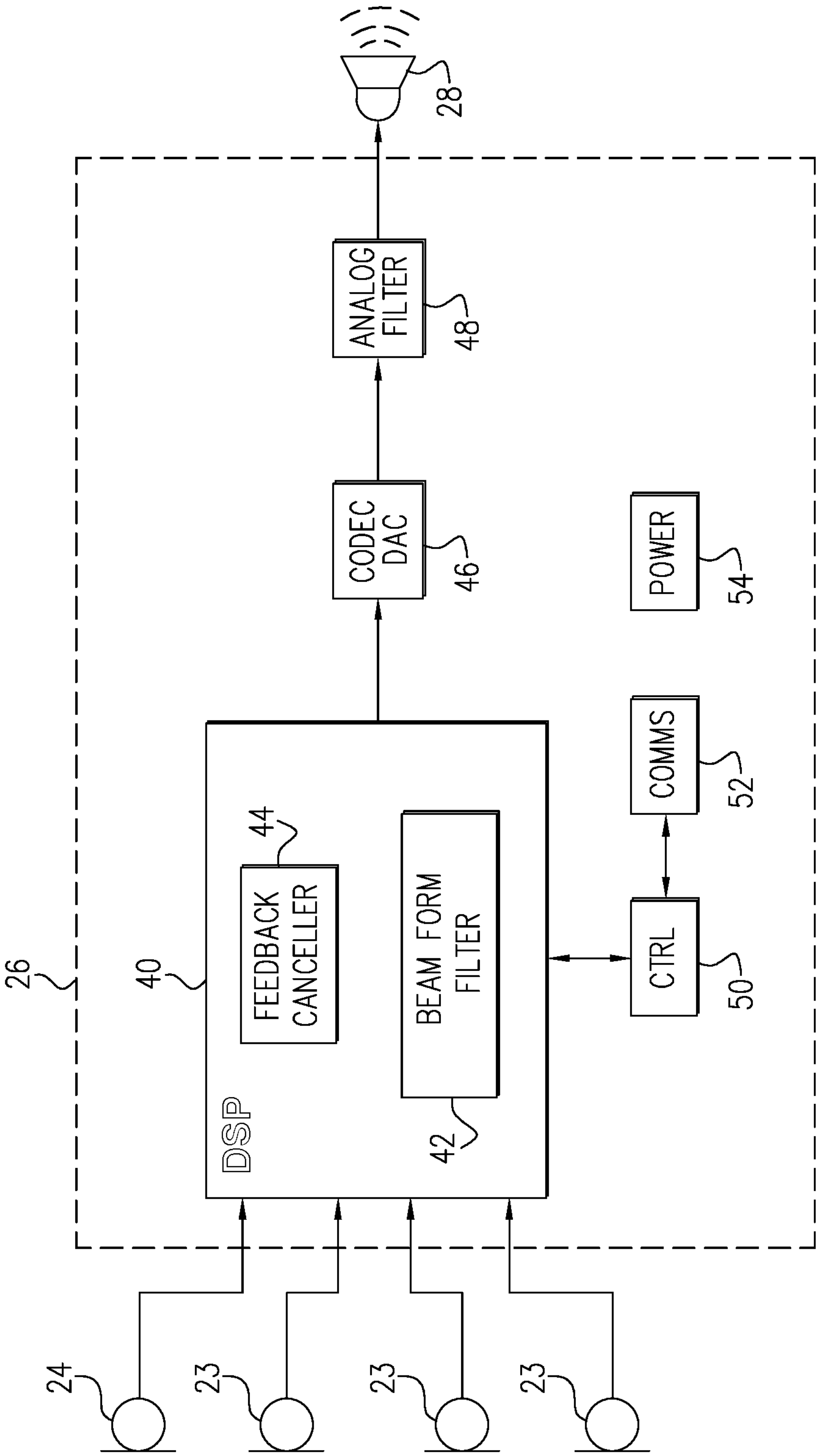
FIG. 2 is a block diagram that schematically shows details of a hearing assistance device, in accordance with an embodiment of the invention.

FIG. 2 is a block diagram that schematically shows details of processing circuitry 26 in hearing assistance device 20, in accordance with an embodiment of the invention. Processing circuitry 26 can be implemented in a single integrated circuit chip or alternatively, the functions of processing circuitry 26 may be distributed among multiple chips, which may be located within or outside spectacle frame 22. Although one particular implementation is shown in FIG. 2, processing circuitry 26 may alternatively comprise any suitable combination of analog and digital hardware circuits, along with suitable interfaces for receiving the electrical signals output by microphones 23, 24 and outputting drive signals to speakers 28.

In the present embodiment, microphones 23, 24 comprise integral analog/digital converters, which output digital audio signals to processing circuitry 26. Alternatively, processing circuitry 26 may comprise an analog/digital converter for converting analog outputs of the microphones to digital form. Processing circuitry 26 typically comprises suitable programmable logic components 40, such as a digital signal processor (DSP) or a gate array, which implement the necessary filtering and mixing functions, as well as feedback cancellation functions, to generate and output a drive signal for speaker 28 in digital form.

These filtering and mixing functions typically include application of a beamforming filter 42 with coefficients chosen to create the desired directional responses. Specifically, in some embodiments the coefficients of beamforming filter 42 are calculated to emphasize sounds that impinge on frame 22 (and hence on microphones 23, 24) within a selected angular range. Details of filters that may be used for the purpose of beamforming are described further hereinbelow.

Alternatively or additionally, processing circuitry 26 may comprise a neural network (not shown), which is trained to determine and apply the coefficients to be used in beamforming filter 42. Further alternatively or additionally, processing circuitry 26 comprises a microprocessor, which is programmed in software or firmware to carry out at least some of the functions that are described herein.

Processing circuitry 26 may apply any suitable beamforming functions that are known in the art, in either the time domain or the frequency domain, in implementing beamforming filter 42. Beamforming algorithms that may be used in this context are described, for example, in the above-mentioned PCT International Publication WO 2017/158507 (particularly pages 10-11) and in U.S. Pat. No. 10,567,888 (particularly in col. 9).

In one embodiment, processing circuitry 26 applies a Minimum Variance Distortionless Response (MVDR) beamforming algorithm in deriving the coefficients of beamforming filter 42. This sort of algorithm is advantageous in achieving fine spatial resolution and discriminating between sounds originating from the direction of interest and sounds originating from the user's own speech. The MVDR algorithm maximizes the signal-to-noise ratio (SNR) of the audio output by minimizing the average energy (while keeping the target distortion small). The algorithm can be implemented in frequency space by calculating a vector of complex weights F(ω) for the output signal from each microphone at each frequency as expressed by the following formula:

$$F(\omega) = \frac{W^H(\omega)S_{zz}^{-1}(\omega)}{W^H(\omega)S_{zz}^{-1}(\omega)W(\omega)}$$

In this formula, W(ω) is the propagation delay vector between microphones 23, representing the desired response of the beamforming filter as a function of angle and frequency; and $S_{zz}(\omega)$ is the cross-spectral density matrix, representing a covariance of the acoustic signals in the time-frequency domain. To compute the coefficients of beamforming filter 42, $S_{zz}(\omega)$ is measured or calculated for isotropic far-field noise.

In an alternative embodiment, processing circuitry 26 applies a Linearly Constrained Minimum Variance (LCMV) algorithm in deriving the coefficients of beamforming filter 42. LCMV beamforming causes the beamforming filter to pass signals from a desired direction with a specified gain and phase delay, while minimizing power from interfering signals and noise from all other directions.

In some embodiments, processing circuitry 26 comprises a feedback canceller 44, which suppresses acoustic feedback from the speaker to the microphones. To this end, feedback canceller 44 uses a digital filter (not shown) having multiple taps with respective tap coefficients selected to suppress feedback from the speaker to the microphones, and to compute the tap coefficients adaptively while estimating respective coherence values of the tap coefficients over time, and weighting updates applied to the tap coefficients responsively to the respective coherence values. The feedback canceller will be described in detail with reference to FIG. 3 below.

An audio output circuit 46, for example comprising a suitable codec and digital/analog converter, converts the digital drive signal output from beamforming filter 42 (or from feedback canceller 44 that follows the beamforming filter) to analog form. An analog filter 48 performs further filtering and analog amplification functions so as to optimize the analog drive signal to speaker 28.

A control circuit 50, such as an embedded microcontroller, controls the programmable functions and parameters of processing circuitry 26, possibly including feedback canceller 44. A communication interface 52, for example a Bluetooth® or other wireless interface, enables the user and/or an audiology professional to set and adjust these parameters as desired. A power circuit 54, such as a battery inserted into temple 32, provides electrical power to the other components of the processing circuitry.

Feedback Cancelation Processing

As noted above, sound waves generated by the speaker of a hearing aid device may be picked up by the device's microphones, which may result in whistle or howl sounds. The goal of a feedback canceller is to prevent whistle artifacts by reducing the amount of feedback signal within the signals produced by the microphones.

Next, principles of feedback cancellation are described. Let Out(t) denote the signal output by the hearing aid, device, let p(t) denote a signal received by the microphones from the output of the hearing aid device alone (a version of Out(t) as received by the microphones), and let y(t) denote a signal received by the microphones from all audio sources other than the speaker of the hearing aid device, wherein t denotes a time axis. The overall signal x(t) produced by the microphones is given by x(t)=y(t)+p(t).

The feedback canceller estimates a feedback signal $\hat{p}(t)$ based on an output signal Out(t−Δt) generated a Δt period earlier (e.g., a reference signal) as follows. The feedback canceller estimates a transfer function from the hearing device output (speaker) to the microphones, denoted $\hat{h}(t)$, and applies the estimated transfer function to the signal Out(t−Δt) to produce the estimated feedback signal given by:

$$\hat{p}(t) = \hat{h}[\mathrm{Out}(t - \Delta t)]$$

The feedback canceller further subtracts the estimated feedback signal from x(t) to produce a signal x'(t) given by:

$$x'(t) = x(t) - \hat{p}(t)$$

in which the feedback is suppressed. In digital form, the transfer function $\hat{h}$ may be implemented using an adaptive filter comprising multiple taps, wherein the tap coefficients are adapted using any suitable adaptive method.

The tap coefficients may be adapted using any suitable gradient descent method such as, for example, the Least Mean Square (LMS) or Normalized LMS (NLMS) method. Alternatively, other suitable adaptation methods can also be used. As will be described below with reference to FIGS. 4A and 4B, depending on whether the feedback cancelation is performed before or after beamforming the adaptive filter may model the transfer function between the speaker and multiple microphones or between the speaker and a single microphone.

Figure 3:
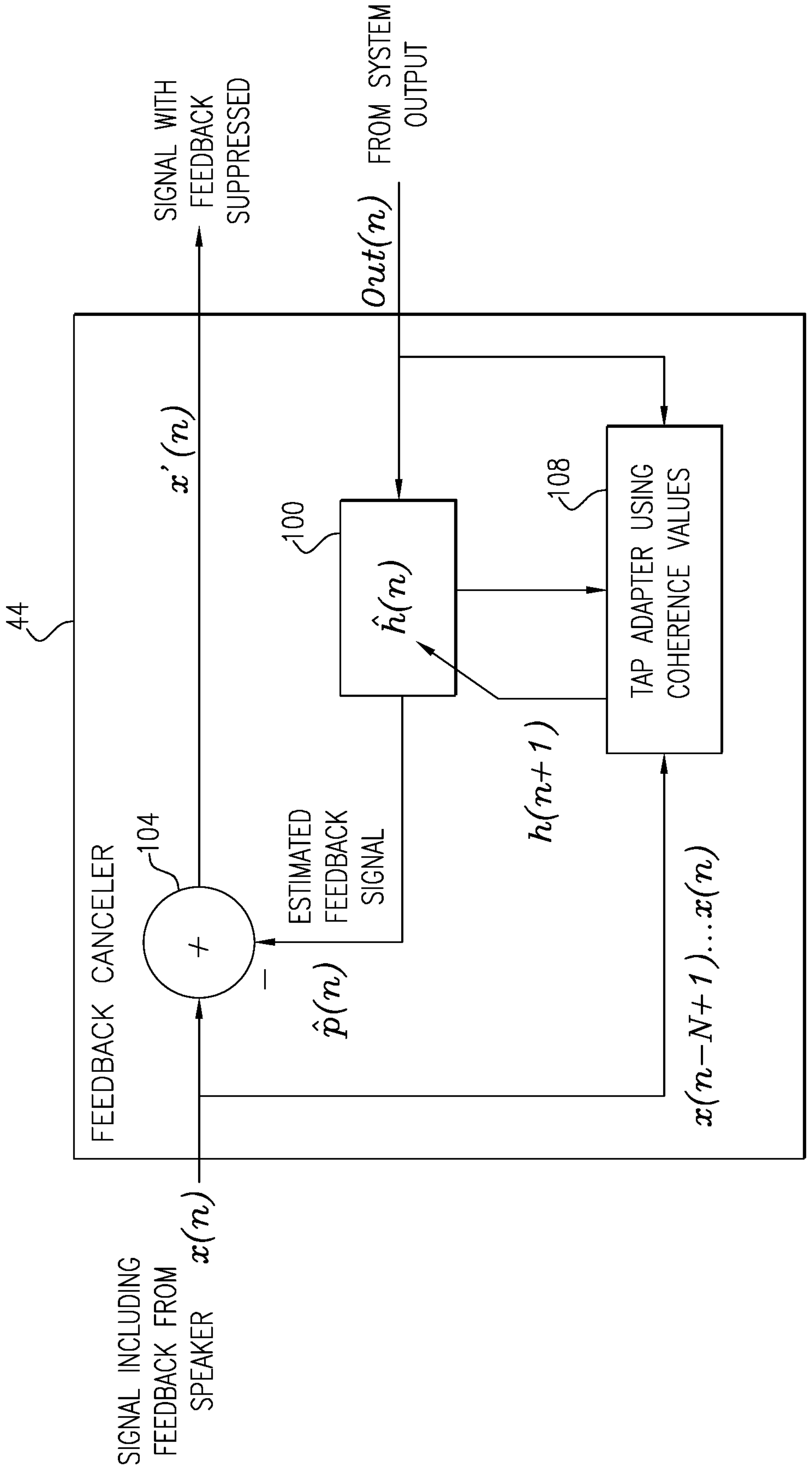
FIG. 3 is a block diagram that schematically illustrates details of a feedback canceller applicable in a hearing assistance device, in accordance with an embodiment of the invention.

FIG. 3 is a block diagram that schematically illustrates details of feedback canceller 44 applicable in hearing assistance device 20, in accordance with an embodiment of the invention. Alternatively, the principles of this feedback canceler may be applied in other devices and systems with suitable microphone arrays, a speaker, and signal processing capabilities.

Feedback canceller 44 of FIG. 3 implements the feedback cancelling principles described above in digital form, wherein the various signals are sampled over a digital time axis denoted 'n'. In the example of FIG. 3, feedback canceller 44 receives an input signal x(n) that was received by microphones 23, 24, and that includes a feedback signal from speaker 28. Using a subtractor 104, the feedback canceller subtracts from x(n) an estimated feedback signal $\hat{p}(n)$ to produce a signal x' in which the feedback is suppressed or canceled.

Feedback canceller 44 comprises an adaptive filter $\hat{h}(n)$ 100 comprising N taps having respective tap coefficients, wherein N is an integer larger than 1. The feedback canceller generates the estimated feedback signal by filtering the output signal Out(n) using the current values of the tap coefficients of adaptive filter 100. In some embodiments the output signal Out(n) comprises the drive signal to the speaker in digital form. The adaptive filter may comprise any suitable number N of taps. In an example embodiment, the number of taps is on the order of 100 or more taps, e.g., 120 taps. The main reasons for selecting such many taps are (i) the feedback cancellation is performed on a tight beamformer, and (ii) the frequency response of the speakers of the underlying hearing eyewear is substantially different from a flat frequency response. Due to these reasons the processed signals are smeared over a relatively long time, which requires a relatively long filter.

A tap adapter 108 updates the tap coefficients of adaptive filter 100 using any suitable gradient descent method such as, for example, the LMS or NLMS method. Let Δh(n) denote a vector of coefficient updates corresponding respectively to the taps of adaptive filter 100. The vector Δh(n) has the same length N as adaptive filter 100. In the present example, the tap adapter performs sequential updating steps as given by:

$$\hat{h}(n+1) = \hat{h}(n) + \Delta h(n)$$

wherein the updates vector Δh(n) is given by:

$$\Delta h(n) = \mu \cdot \text{Out}(n) \cdot X(n)$$

wherein μ is a scalar convergence factor of the underlying gradient descent method, and the vector X(n) is given by:

$$X(n) = [x(n-N+1) \ldots x(n)]$$

Next are described embodiments in which adaptation of the tap coefficients by tap adapter 108 is based on multiple convergence factors rather than on a single scalar convergence factor. In such embodiments, for each tap, the common convergence factor μ is weighted by a respective weight value. In some embodiments the tap adapter calculates the weight values by calculating respective tap coherence values as described herein. This approach provides a time-based weighting mechanism for modifying the updates Δh(n) applied to the tap coefficients of the adaptive filter. The inventors discovered that in an open ear hearing eyewear, for example, weighting the tap coefficient updates by respective time-coherence values of the taps may improve the feedback cancellation performance significantly.

The performance of a feedback cancellation method may be determined, for example, by measuring the maximal acoustic output gain for which the underlying system remains stable without whistling. The inventors found that the gain applicable using the disclosed coherence based feedback cancellation method is significantly higher than the gain achievable while the coherence values are omitted.

In general, using coherence values involves assessing the updates adaptively applied to each tap of the adaptive filter over a short period, e.g., over a period of 16 milliseconds (or any other suitable period), and respectively weighting the updates of the tap coefficients based on the coherence values. In some embodiments the coherence value $C_i$ for weighting the coefficient update of the $i^{th}$ tap is given, for example, by:

$$C_i = \frac{\left(\sum_{n=1}^{W} \Delta h_i^n\right)^2}{W \cdot \sum_{n=1}^{W} (\Delta h_i^n)^2}$$

Wherein n denotes a digital time index, $\Delta h_i^n$, denotes the coefficient update applied to the $i^{th}$ tap at time n, and W denotes the number of samples used for calculating the coherence value. The coherence value falls in a range between 0 and 1 and gets the maximal value of 1 when all the coefficient values used for calculating it equal one another. Although not mandatory, the coefficient value may be calculated based on a sequence of W consecutive tap updates recently applied to the relevant tap. Alternatively, other recent W tap updates can also be used. The gradient factor $\tilde{\mu}_i$ for the $i^{th}$ tap coefficient, weighted by the $i^{th}$ coherence value is given by:

$$\tilde{\mu}_i = \mu \cdot C_i$$

The coherence values $C_i$ are indicative of respective reliability levels associated with the coefficient updates. The gradient factor μ is weighted high when the tap is associated with a large coherence value (the update is considered highly reliable) and weighted lower when that tap is associated with a smaller coherence value (in which case the update is considered less reliable).

The method for calculating the coherence values as described above is given by way of example and other types of coherence values can also be used. For example, a sign coherence value with reduced complexity is given by:

$$C_i^{sign} = 1 - \sqrt{1 - \left[\frac{1}{W} \cdot \sum_{n=1}^{W} \text{sign}(\Delta h_i^n)\right]^2}$$

As another example, the coherence values may be generalized by multiplying each coherence value $C_i$ by a factor $C_g$ given by:

$$C_g = \frac{\left(\sum_i C_i\right)^2}{W' \cdot \sum_i (C_i)^2}$$

wherein the sums in the last equation are taken over a number W'>1 of taps.

In embodiments in which feedback cancellation is performed in the frequency domain, phase coherence factors can be applied. Example formulation of this sort may be found, for example, in a paper entitled "Phase Coherence Imaging: Principles, applications and current developments," Bruges, Belgium, Signal Processing in Acoustics: PSP (2/3) Presentation 1.

Beamforming and Feedback Cancelation Schemes

Figure 4A:
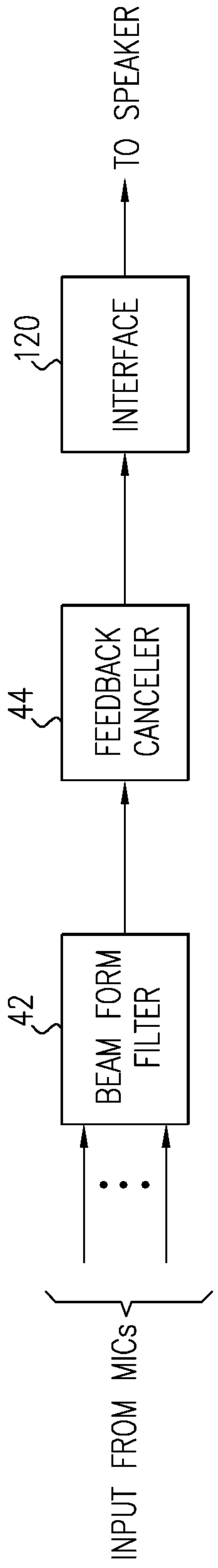
FIGS. 4A and 4B are block diagrams that schematically illustrate processing schemes supporting both beamforming and feedback cancelation, in accordance with embodiments of the invention.
Figure 4B:
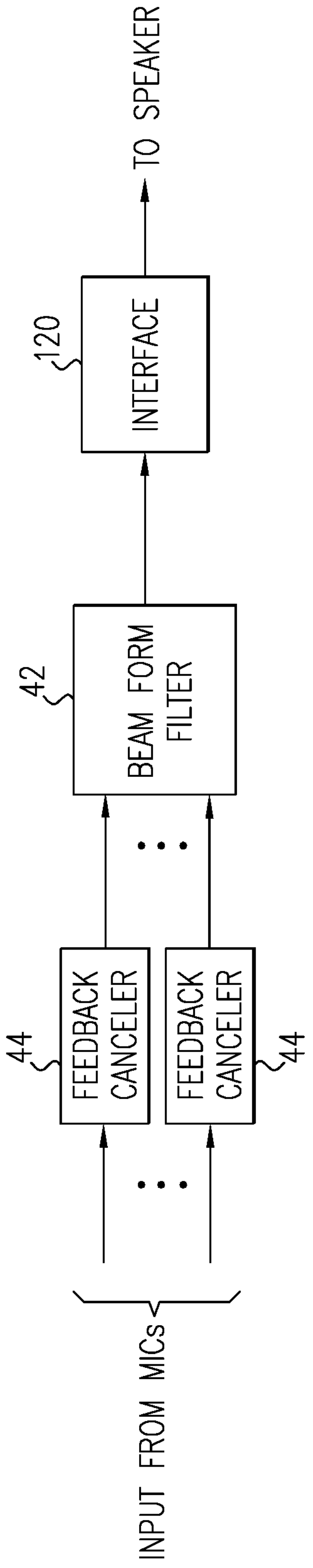

FIGS. 4A and 4B are block diagrams that schematically illustrate processing schemes supporting both beamforming and feedback cancelation, in accordance with embodiments of the invention.

The schemes in FIGS. 4A and 4B differ from one another by the order in which beamforming and feedback cancellation are performed.

In the scheme of FIG. 4A, input signals from multiple microphones are processed by a beamforming filter such as, for example, beamforming filter 42 of FIG. 2 above. The signal output by the beamforming filter is then subjected to feedback cancellation, e.g., using feedback canceler 44 of FIGS. 2 and 3. In such embodiments, the adaptive filter $\hat{h}(n)$ of FIG. 3 models a transfer function from the speaker (e.g., 28 of FIG. 2) to a combined (virtual) microphone comprising the multiple microphones. An interface 120 provides the signal output by the feedback canceller to the speaker. Interface 120 may comprise, for example, a codec/DAC (e.g., 46 of FIG. 2) followed by an analog filter (e.g., 48 of FIG. 2).

In the scheme of FIG. 4B, input signals from multiple microphones are processed by dedicated respective feedback cancellers 44. The outputs of the feedback cancellers are input to a beamforming filter 42, whose output is provided to the speaker via interface 120. In such embodiments, the adaptive filter ĥ(n) of FIG. 3 models a transfer function from the speaker (e.g., 28 of FIG. 2) to an individual microphone.

The scheme of FIG. 4A is less complex than the scheme of FIG. 4B because it has only one feedback canceler rather than multiple feedback cancellers. Moreover, beamforming performance in the scheme of FIG. 4A may outperform that of FIG. 4B because applying separate feedback cancellation to individual microphones (as in FIG. 4B) may degrade the correlation between the microphones, which is required for proper operation of the beamforming filter.

On the other hand, the scheme in FIG. 4B may be advantageous over the scheme of FIG. 4A because in performing feedback cancellation on each one of the microphones separately more information and degrees of freedom are available for mitigating issues such as howling. Moreover, providing multiple microphone feedback-free audio channels (as in FIG. 4B) could be used in implementing various algorithms other than beamforming. Example relevant algorithms in this regard include (but not limited to): own voice detection, estimation of a direction of arrival, and transfer functions and room sound level measurements.

Although the embodiments described herein mainly address feedback cancelation in a hearing assistance device, the methods and systems described herein can also be used in applications, such as in feedback cancellation in other HMD devices, and in noise-canceling headphones.

It will be appreciated that the embodiments described above are cited by way of example, and that the following claims are not limited to what has been particularly shown and described hereinabove. Rather, the scope includes both combinations and sub-combinations of the various features described hereinabove, well as as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system for hearing assistance, comprising:

one or more microphones, which are configured to be mounted in proximity to a head of a subject and to output electrical signals in response to acoustic waves that are incident on the microphones;

a speaker, which is configured for proximity to an ear of the subject; and processing circuitry, which is configured to amplify and filter the electrical signals so as to generate a drive signal for input to the speaker using a digital filter having multiple taps with respective tap coefficients selected to suppress feedback from the speaker to the microphones, and which is configured to compute the tap coefficients adaptively while estimating respective coherence values of the tap coefficients over time and weighting updates applied the tap coefficients responsively to the respective coherence values, wherein, to compute the tap coefficients adaptively, the processing circuitry is configured to adapt the tap coefficients using a gradient descent method having respective convergence factors, and to calculate the convergence factors by multiplying a common convergence factor by the respective coherence values.

2. The system according to claim 1, wherein the processing circuitry is configured to adapt the tap coefficients so as to estimate a transfer function between the speaker and one or more of the microphones.

3. The system according to claim 1, wherein the processing circuitry is configured to evaluate a coherence value for a given tap based on multiple coefficient updates calculated for the given tap over a specified time period.

4. The system according to claim 1, and comprising a spectacle frame, wherein the microphones and the speaker are mounted at respective locations on the spectacle frame.

5. The system according to claim 1, wherein the one or more microphones comprise multiple microphones, and wherein the processing circuitry is configured to apply a beamforming function to the electrical signals output by the multiple microphones so as to emphasize selected sounds that originate within a selected angular range while suppressing background sounds originating outside the selected angular range.

6. A method for hearing assistance, comprising:

mounting in proximity to a head of a subject an array of microphones, which output electrical signals in response to acoustic waves that are incident on the microphones;

mounting a speaker in proximity to an ear of the subject; and amplifying and filtering the electrical signals so as to generate a drive signal for input to the speaker using a digital filter having multiple taps with respective tap coefficients selected to suppress feedback from the speaker to the microphones, and computing the tap coefficients adaptively while estimating respective coherence values of the tap coefficients over time and weighting updates applied to the tap coefficients responsively to the respective coherence values, wherein computing the tap coefficients comprises adapting the tap coefficients using a gradient descent method having respective convergence factors, and wherein calculating the convergence factors comprises multiplying a common convergence factor by the respective coherence values.

7. The method according to claim 6, wherein computing the tap coefficients comprises adapting the tap coefficients so as to estimate a transfer function between the speaker and one or more of the microphones.

8. The method according to claim 6, and comprising evaluating a coherence value for a given tap based on multiple coefficient updates calculated for the given tap over a specified time period.

9. The method according to claim 6, wherein the microphones and the speaker are mounted at respective locations on a spectacle frame.

10. The method according to claim 6, wherein the one or more microphones comprise multiple microphones, and comprising applying a beamforming function to the electrical signals output by the multiple microphones so as to emphasize selected sounds that originate within a selected angular range while suppressing background sounds originating outside the selected angular range.

* * * * *